Sept. 21, 1943.  A. E. EVANS  2,330,116
COMBINATION OIL REFINER AND FILTER
Filed April 4, 1941   2 Sheets-Sheet 1
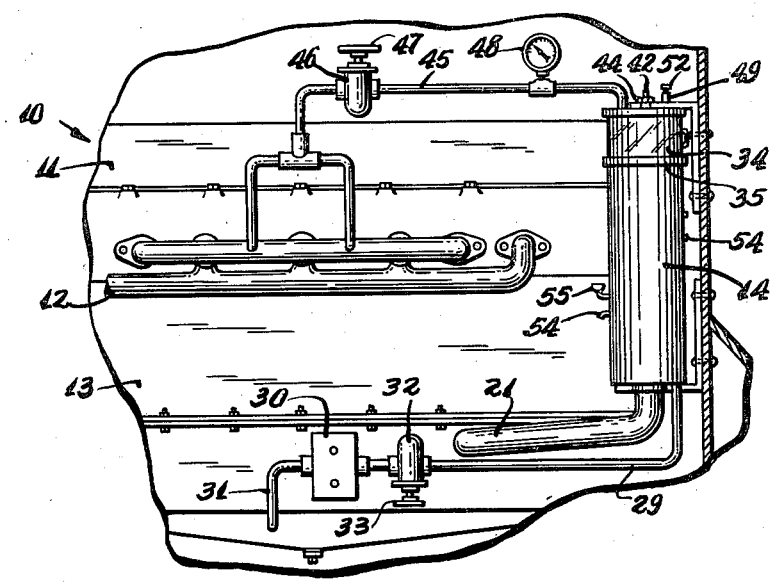
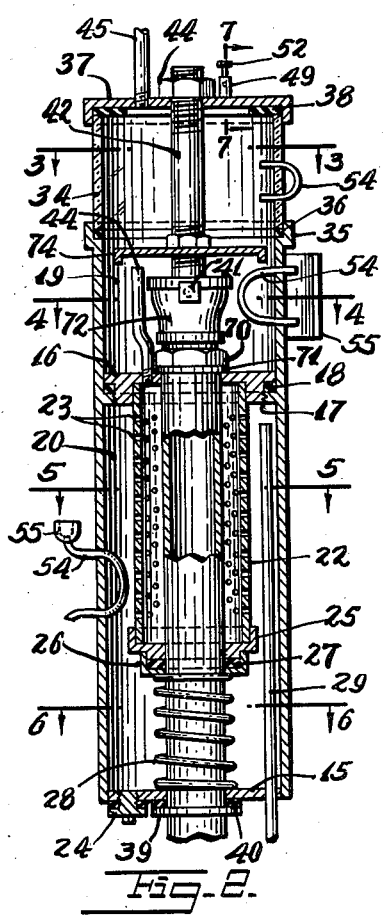
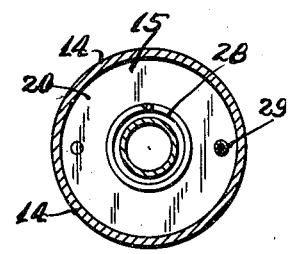
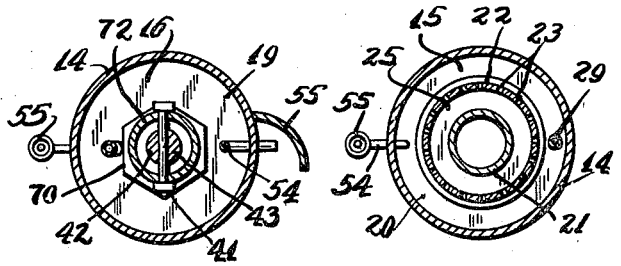
INVENTOR
*Albert E. Evans*
BY
ATTORNEY Sept. 21, 1943.    A. E. EVANS    2,330,116
COMBINATION OIL REFINER AND FILTER
Filed April 4, 1941    2 Sheets-Sheet 2
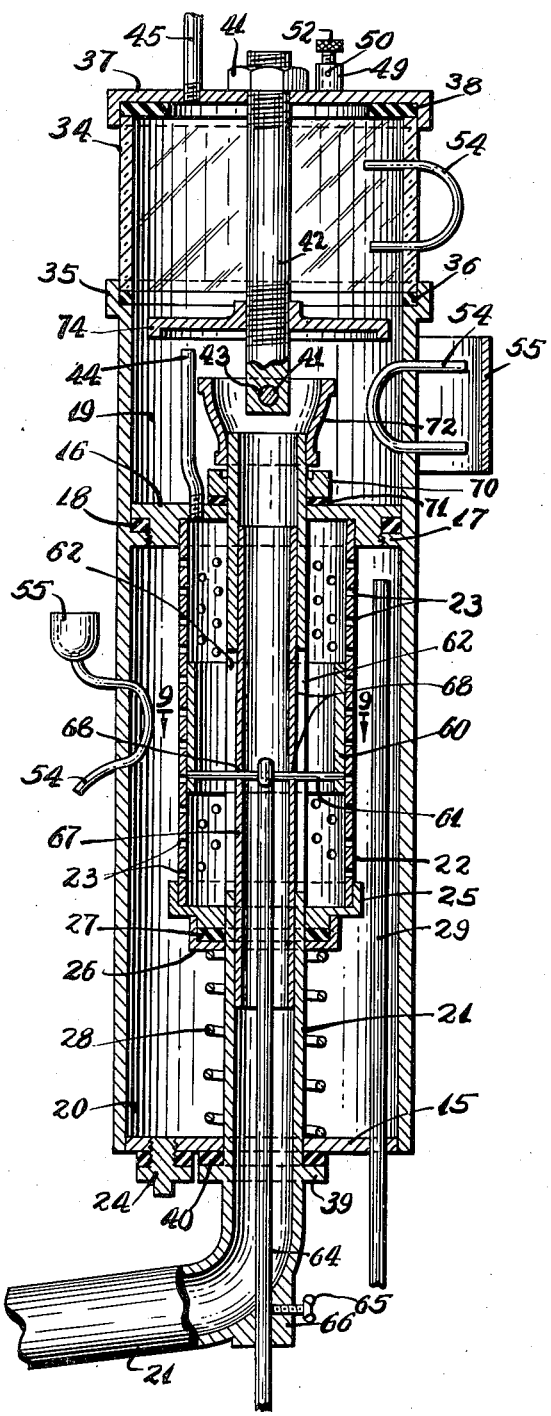
Fig. 7.
Fig. 8.
Fig. 8.
INVENTOR
Albert E. Evans
ATTORNEY Patented Sept. 21, 1943

2,330,116

UNITED STATES PATENT OFFICE 2,330,116

COMBINATION OIL REFINER AND FILTER

Albert E. Evans, Fairview, N. J.

Application April 4, 1941, Serial No. 386,833

13 Claims. (Cl. 210—150.5)

This invention relates to new and useful improvements in a combination oil refiner and filter.

In the operation of conventionally constructed internal combustion engines it is common for a quantity of gasoline to pass the pistons in the cylinder block and enter the crank case and mix with the oil contained therein. It is the purpose of this invention to provide a means for effectively filtering the oil to remove the impurities therefrom and to recover a large portion of the gasoline which normally dissipates into the crank case.

More specifically the invention proposes the construction of a device characterized by a tubular body arranged to receive and hold a quantity of oil from the crank case and to provide a means for effectively filtering the oil and then causing the same to be passed through a hollow portion of the body to cause the gasoline contained therein to evaporate therefrom for the purpose here and above outlined.

Still further the invention proposes the provision of a strainer or filter arranged in a novel means so as to cause all oil entering the body to pass through the filter before it may again enter the crank case.

Still further the invention proposes the provision of a novel means for blocking certain of the openings in the filter in a manner to cause these openings to be inoperative, in a manner to permit these openings to be brought into operation in the event the used openings should become blocked to the passage of oil and so prevent the jamming up of the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a part of an internal combustion engine having an oil refiner and filter constructed in accordance with this invention.

Fig. 2 is a vertical sectional view of the oil refining device.

Fig. 3 is a horizontal sectional view taken on the line 3—3 of Fig. 2.

Fig. 4 is a horizontal sectional view taken on the line 4—4 of Fig. 2.

Fig. 5 is a horizontal sectional view taken on the line 5—5 of Fig. 2.

Fig. 6 is a horizontal sectional view taken on the line 6—6 of Fig. 2.

Fig. 7 is a vertical sectional view taken on the line 7—7 of Fig. 2.

Fig. 8 is an enlarged vertical sectional view similar to Fig. 2 but illustrating a modification of the invention.

Fig. 9 is a horizontal sectional view taken on the line 9—9 of Fig. 8.

The combination oil refiner and filter, according to this invention, is to be used in combination with an internal combustion engine 10 comprising a cylinder block 11 having an intake manifold 12 for supplying combustible fuel in the form of gasoline to the cylinders of the block 11. Beneath the cylinder block 11 there is provided an oil pan or crank case 13 holding a quantity of lubricating oil for bathing the parts of the crank shaft for the purpose of lubricating for same.

The oil refiner and filter includes a tubular body 14 for holding a quantity of oil from the crank case 13 of the internal combustion engine 10. This tubular body 14 is constructed of metal. There is a pair of spaced walls 15 and 16 extended across the body 14. The wall 15 closes the bottom end of the tubular body 14. The wall 16 is arranged within the tubular body 14 intermediate of its ends and is retained in position by its threaded engagement with an internal flange 17 formed within the tubular body 14.

A rubber gasket 18 is disposed between the adjacent faces of the flange 17 and the wall 16 to seal these surfaces and divide the interior of the body 14 into an upper compartment 19 and a lower compartment 20.

An oil return pipe 21 has one of its ends connected to the crank case 13 and the other of its ends projected axially upwards through the walls 15 and 16 and has its free end disposed above the top end of the tubular body 14. This oil return pipe 21 is provided for the purpose of returning the refined oil to the crank case as will be hereinafter further described as this specification proceeds.

An oil strainer or filter 22 is located within the lower compartment 20 of the tubular body 14 and coaxially encircles that portion of the oil return pipe 21 which extends through the compartment 20. This oil strainer 22 is constructed of metal and is provided of plurality of minute openings 23 through which the oil is adapted to pass and which are small enough to prevent the passage of impurities causing the same to be trapped within the lower compartment 20. The bottom wall 15 of the compartment 20 is provided with a plug 24 through which the impurities are adapted to be drawn from the tubular body 14.

A novel means is provided by retaining the strainer 22 in position within the tubular body 14. From an inspection of Fig. 2 it will be noted that the bottom face of the wall 16 is provided with a recess into which the top end of the strainer engages. The bottom end of the strainer 22 is closed by means of a cap 25 coaxially encircling the oil return pipe 21 and extended across the bottom end of the strainer 22. It is the cap 25 and the recess in the wall 16 which act to coaxially hold the strainer 22 in its encircling position about the oil return pipe 21. A cup-shaped member 26 engages the oil return pipe 21 immediately adjacent the cap 25 and encloses a gasket which bears against the bottom face of the cap 25 for sealing the passage between the cap and the oil return pipe 21 to prevent the passage of refined oil at this point.

It will be noted that the bottom end of the strainer 22 is disposed quite a distance above the top face of the bottom wall 15 providing a space in which the impurities strained from the oil are adapted to collect so as to prevent them from interfering with the openings 23 in the strainer 22. This space also permits the engagement of an expansion spring 28 about the lower portion of the oil return pipe 21. This spring 28 operates between the top face of the wall 15 and the bottom face of the cup-shaped member 26. This urges the cup-shaped member 26 upwards in turn urging the cap 25 upwards. The cap 25 in turn bears against the lower end of the strainer 22 and causes its upper end to be fixedly maintained in position within the recess formed in the bottom face of the wall 16.

An oil inlet pipe 29 extends into the compartment 20 through the bottom wall 15. This pipe 29 has its outer end connected to a conventionally constructed oil pump 30. Details of the oil pump will not be given in this specification as it does not form any part of this invention. However, it will suffice to say that the oil pump 30 is in turn connected by means of a pipe 31 to the bottom wall of the crank case 13 for drawing oil from the crank case to be circulated through the body 14. The inlet pipe 29 also includes a valve 32 which is adapted to be opened and closed by means of a handle 33 to control the passage of oil through this pipe.

An auxiliary tubular member 34 is mounted upon the top end of the tubular body 14 and has its top end projected beyond the top end of the oil return pipe 21. This auxiliary tubular member 34 is constructed of glass and has its bottom end extended into and resting upon an offset shoulder 35 formed on the top end of the tubular body 14. A rubber gasket 36 is disposed between the adjacent faces of the shoulder 35 and the bottom end of the auxiliary tubular member 34 for sealing these surfaces. A wall 37 closes the top end of the auxiliary tubular member 34 for completing encasing the top end of the oil return pipe 31. A rubber gasket 38 is also engaged between the adjacent faces of the wall 37 and the top end of the auxiliary tubular member 34 for sealing these surfaces.

A means is provided for holding the wall 37 and auxiliary tubular member 34 and the tubular body 14 together as a unit. This means comprises an outwardly extending flange 39 formed on the oil return pipe 21 at a point adjacent the bottom face of the wall 15. A rubber gasket 40 is disposed between the adjacent faces of the wall 15 and flange 39 to prevent oil from leaking through the bottom wall at the point where the oil return pipe 21 passes through the bottom wall. A nut 70 is threadedly engaged upon the oil return pipe 21 and engages the top face of the wall 16. A gasket 71 is disposed between the nut 70 and the wall 16 to seal these surfaces. The flange 39 and nut 70 act to hold the oil return pipe fixedly in position within the body 14. A tubular flared member 72 is mounted upon the top end of the oil return pipe 21. The flared member 72 has a small bolt 41 extended diametrically there-across. A rod 42 extends from the top end of the flared member 72. The bottom end of the rod 42 has an opening 43 through which the small bolt 41 extends. The free end of the rod 42 is passed through a centrally located opening formed in the wall 37. This free end of the rod 41 is provided with threads and carries a nut 44 which is adapted to be tightly engaged against the top wall 37. When the nut 44 is tightly engaged against the top wall 37 it will pull the wall 37 into position across the top end of the auxiliary tubular member 34.

A pipe 45 has its bottom end extended through the wall 16 and is provided for the purpose of connecting the interior of the strainer 22 with the interior of the top compartment 19. This pipe 44 is provided for the purpose of carrying the refined oil from the interior of the strainer to the top compartment 19. As the interior of the strainer 22 becomes filled with oil it will seek its way upwards within the pipe 44 and discharge from the top end thereof into the compartment 19. As the refined oil passes downwards along the sides of the pipe 44 the gasoline which collected within the oil while in the crank case will evaporate therefrom and be collected within the top portion of the compartment 19 above the top end of the oil return pipe 21. A plate 74 is adjustably mounted by means of interengaging threads upon the rod 42 above the top end of the pipe 44. This plate acts to diffuse the gasoline which evaporates from the oil throughout the interior of the top portion of the compartment 19. As the interior of the top compartment 19 fills up the rising oil will pass over the top end of the oil return pipe 21 and flow downwards through the pipe and gravity will cause this oil to be returned to the crank case 13 in a refined condition.

A pipe 45 connects the interior of the top compartment 19 with the intake manifold 12 of the internal combustion engine 10. More specifically the pipe 45 has one of its ends extended through the wall 37 closing the top end of the compartment 19. It is so arranged that suction set up within the intake manifold will draw the gasoline collecting within the top portion of the auxiliary tubular member 34 through the pipe 45 into the manifold 12. The pipe 45 is provided with a valve 46 manually controllable by means of a handle 47 to close off the pipe 45. The pipe 45 also includes a gauge 48 for accurately indicating the pressure in this line.

A manually controllable needle valve is provided for connecting the top portion of the auxiliary tubular member 34 with the outside atmosphere so as to prevent the formation of a vacuum within the top portion of the tubular member 34 so as to prevent the oil within the top compartment 19 from rising above the top end of the oil return pipe 21. This prevents the oil from being sucked through the pipe line 45 into the intake manifold 12. This needle valve is characterized by a tubular extension 49 extended upwardly from the top wall 37. This extension is provided with diametrically opposite openings 50 and an internal thread 51. A fine screw 52 is adapted to be threadedly engaged into the top end of the tubular extension 49 and is provided with a pointed bottom end 53. The pointed end 53 when brought into certain aligned positions with the openings 50 is adapted to control the passage of air through the openings 50 to prevent the formation of a vacuum in the top portion of the tubular member 34.

The device is also provided with a means for cooling the oil contained within the tubular body 14. This means is characterized by short lengths of arcuately shaped pipe material 54 which are extended through the walls of the tubular body 14 and the walls of the auxiliary tubular member 34. Certain of these pipes 54 have their ends directed outwards for permitting air to circulate therethrough while others have their open ends directed inwards for permitting oil to circulate therethrough and be cooled by the surrounding atmosphere. Certain of the pipes 54 are provided with baffles 55 for catching the air circulated by the fan of the internal combustion engine to cause the air to enter the pipes 54. While only a few of these pipes are illustrated on the drawings it is hereby pointed out that this is done merely for sake of clarity and in actual practice it is proposed to provide the device with a greater number of these pipes.

The operation of the device is as follows:

The oil refiner and filter device is adapted to be attached to the internal combustion engine 10 as illustrated in Fig. 1. When the internal combustion engine operates the pump 30 will also operate drawing dirty gas filled oil from the crank case 13 forcing the same upwards through the pipe 39 to the interior of the compartment 20 within the tubular body 14. The oil will rise in this compartment and pass through the minute openings 23 of the strainer 22. These minute openings will permit the ready passage of oil but will prevent the passage of impurities. The impurities will fall downwards and collect within the bottom portion of the compartment 20 to be drawn therefrom when the plug 24 is removed. The oil having the impurities removed therefrom will rise within the strainer 22 and will pass upwards through the pipe 44 into the top compartment 19. As the oil flows over the top end of this pipe 44 the gasoline contained therein will evaporate therefrom and collect within the top portion of this compartment adjacent the wall 37. As the refined and gas relieved oil collects in the top compartment 19 it will raise therein and flow over the top end of the oil return pipe 21. Gravity is relied upon to return the oil to the crank case 13. The gasoline fumes collected within the top portion of the compartment 19 will be drawn through the pipe 45 by means of suction set up within the manifold 12 causing this gas to re-enter the cylinder block and be exploded to impart power to the engine.

In Figs. 8 and 9 a modified oil refiner is illustrated, which is somewhat similar to that previously described except for the provision of a means for blocking certain of the openings 23 of the strainer 22. In this form of the invention a sleeve 60 of the diameter equal to the inside diameter of the strainer 22 is slidable mounted within the strainer in facial contact with the inside walls thereof.

A means is provided for moving the sleeve 60 to various positions within the strainer 22 for blocking certain of the passages 23 to control the passage of oil therethrough. A pin 61 is extended diametrically across the bottom end of the sleeve 60. This pin 61 passes through diametrically opposite longitudinal slots 62 formed in sides of the oil return pipe 21. A rod 64 extends downwards through the oil return pipe 21. This rod 64 has its top end attached to the pin 61. The bottom end of the rod 64 passes through the wall of a bend formation in the oil return pipe 21. A wing screw 65 is extended through a boss 66 formed on the oil return pipe 21 for holding the rod 64 in various shifted positions to similarly hold the sleeve 60.

A means is also provided for closing the slots 62 to prevent the refined oil from entering the oil return pipe 21 before it has had an opportunity to pass upwards through the pipe 44. This means comprises a tubular member 67 located within the oil return pipe 21 and in facial engagement with the inside walls thereof. The pin 61 of the sleeve 60 is frictionally extended through openings 68 formed in the tubular member 67. The tubular member 67 is adapted to move with the sleeve 60 as the sleeve 60 is moved and since it is of a length materially greater than the length of the slots 62 it will act to close off these slots in all of the shifted positions of the sleeve 60.

This sleeve 60 is provided for the purpose of blocking the passage of oil through certain of the passages 23 to prevent the blocked passages from becoming clogged with residue left behind by the circulating oil. Thus, if the passages being used become blocked and clogged with residue preventing the free circulation of oil it is possible to shift the sleeve 60 and expose the protected passages permitting oil to pass preventing a complete jam up of the device.

In other respects this form of the invention is similar to that previously described and like reference numerals are used to identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member.

2. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, said second mentioned pipe being extended beyond the top end of said oil return pipe so that said oil entering said auxiliary tubular member through said second pipe will flow downwards along the outside of said second pipe permitting gasoline in said oil to evaporate and collect within the top of said auxiliary member, and a pipe connected at one end to an intake manifold and having its other end projected eccentrically through said wall closing the top of said auxiliary tubular member for conveying gasoline collecting within this tubular member back to said manifold.

3. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, said strainer being constructed of a tubular piece of metal provided with minute openings through which said oil is adapted to pass exclusive of impurities.

4. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, said tubular strainer having its top end extended into a recess formed in the bottom face of the top wall of said pair of walls, and means for continually urging said strainer into its engaged position with said recess.

5. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, said tubular strainer having its top end extended into a recess formed in the bottom face of the top wall of said pair of walls, and means for continually urging said strainer into its engaged position with said recess, comprising a cap slidably concentrically mounted on said oil return pipe and engaging the bottom end of said strainer, and an expansion spring concentrically mounted on said oil return pipe and operating between said cap and the top face of the wall closing said tubular body for urging said cap into position on the bottom end of said strainer and the top end of said strainer into position in said recess.

6. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for locking said oil return pipe, said tubular body, said auxiliary tubular member and all of said walls together as a unit.

7. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for locking said oil return pipe, said tubular body, said auxiliary tubular member and all of said walls together as a unit, comprising a flange formed on said oil return pipe and engaging the bottom face of the wall closing the bottom of said tubular body, a bolt extended diametrically across the top end of said oil return pipe, a rod having its bottom end engaged on said bolt and extended upwards through a concentric opening in said wall closing the top of said auxiliary tubular member, and a nut threadedly engaged on the extended end of said rod and engageable against the top face of said latter-mentioned wall.

8. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for cooling the oil contained in said tubular body and said auxiliary tubular member.

9. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for cooling the oil contained in said tubular body and said auxiliary tubular member, comprising arcuately shaped pipes mounted through the walls of said tubular body and said auxiliary tubular member and having open ends projected outwards, and baffle members mounted on the outer faces of said tubular body and said auxiliary tubular body adjacent said pipes for directing outside air into the open ends of said pipes to circulate therethrough.

10. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for blocking certain of the openings in said strainer to prevent these openings from becoming blocked with residue.

11. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for blocking certain of the openings in said strainer to prevent these openings from becoming blocked with residue, said latter means, comprising a sleeve slidably supported within said strainer and in face contact with the inner wall thereof, a pin extended diametrically across said sleeve and through oppositely disposed slots formed in said oil return pipe, a rod having one end connected to said pin and its other end extended concentrically through said oil return pipe and through a boss formed at a bend in said oil return pipe by which said sleeve may be moved, and means for closing said slots in said oil return pipe to prevent oil from the interior of said strainer from entering said oil return pipe.

12. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said auxiliary tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for blocking certain of the openings in said strainer to prevent these openings from becoming blocked with residue, said latter means, comprising a sleeve slidably supported within said strainer and in face contact with the inner wall thereof, a pin extended diametrically across said sleeve and through oppositely disposed slots formed in said oil return pipe, a rod having one end connected to said pin and its other end extended concentrically through said oil return pipe and through a boss formed at a bend in said oil return pipe by which said sleeve may be moved, and means for closing said slots in said oil return pipe to prevent oil from the interior of said strainer from entering said oil return pipe, said latter means, comprising a tubular member within said oil return pipe and mounted on said pin, said tubular member being in facial engagement with the inside face of said oil return pipe.

13. A combination oil refiner and filter, comprising a tubular body for holding a quantity of oil from the crank case of an internal combustion engine, a pair of spaced walls mounted across said body with one closing the bottom of said body and the other being disposed intermediate the ends of said body, an auxiliary tubular member mounted on the top of said tubular body, a wall closing the top of said tubular body, a tubular strainer disposed concentrically within said body and extended downwards from the top wall of said pair of walls and having its bottom end disposed at a point substantially above the wall closing the bottom of said body, an oil inlet pipe having one end connected to an oil pump and its other end extended into said body eccentrically through said bottom wall and disposed adjacent the bottom face of the top wall of said pair of walls outside of said strainer, a pipe extended eccentrically through the top wall of said pair of walls and having its bottom end disposed within said strainer and its top end disposed within said auxiliary tubular member, and an oil return pipe connected at one end with a crank case and having its other end extended concentrically through said pair of walls, said body and said tubular strainer to connect with the interior of said auxiliary tubular member, and means for blocking certain of the openings in said strainer to prevent these openings from becoming blocked with residue, said latter means, comprising a sleeve slidably supported within said strainer and in face contact with the inner wall thereof, a pin extended diametrically across said sleeve and through oppositely disposed slots formed in said oil return pipe, a rod having one end connected to said pin and its other end extended concentrically through said oil return pipe and through a boss formed at a bend in said oil return pipe by which said sleeve may be moved, and means for closing said slots in said oil return pipe to prevent oil from the interior of said strainer from entering said oil return pipe, and a set screw threadedly engaged through said boss and abutting said rod for holding said rod in various shifted positions to similarly hold said sleeve.

ALBERT E. EVANS.